United States Patent
Darden, II et al.

(10) Patent No.: US 8,751,036 B2
(45) Date of Patent: *Jun. 10, 2014

(54) SYSTEMS AND METHODS FOR MICROGRID POWER GENERATION MANAGEMENT WITH SELECTIVE DISCONNECT

(75) Inventors: Thomas Francis Darden, II, Raleigh, NC (US); James Kevin Szyperski, Atlanta, GA (US); Joseph W. Forbes, Jr., Raleigh, NC (US)

(73) Assignee: Causam Energy, Inc., Raleigh, NC (US)

( * ) Notice: Subject to any disclaimer, the term of this patent is extended or adjusted under 35 U.S.C. 154(b) by 350 days.

This patent is subject to a terminal disclaimer.

(21) Appl. No.: 13/247,972

(22) Filed: Sep. 28, 2011

(65) Prior Publication Data

US 2013/0079943 A1   Mar. 28, 2013

(51) Int. Cl.
*G06F 19/00* (2011.01)

(52) U.S. Cl.
USPC .......................................... 700/219; 700/295

(58) Field of Classification Search
USPC .................. 700/219, 295; 307/64, 29
See application file for complete search history.

(56) References Cited

U.S. PATENT DOCUMENTS

| | | | | |
|---|---|---|---|---|
| 6,107,693 A * | 8/2000 | Mongia et al. | ................... | 290/52 |
| 6,219,623 B1 | 4/2001 | Wills | | |
| 6,583,521 B1 * | 6/2003 | Lagod et al. | ................... | 307/70 |
| 6,815,932 B2 | 11/2004 | Wall | | |
| 6,926,748 B2 * | 8/2005 | Goebel et al. | ................ | 48/127.9 |
| 7,115,010 B2 | 10/2006 | Parrott | | |
| 7,138,728 B2 | 11/2006 | LeRow | | |
| 7,427,815 B1 | 9/2008 | Ye | | |
| 7,561,977 B2 * | 7/2009 | Horst et al. | ................. | 702/62 |
| 7,580,817 B2 * | 8/2009 | Bing | .................. | 703/6 |
| 7,657,480 B2 | 2/2010 | Harper | | |
| 7,834,479 B2 | 11/2010 | Capp | | |
| 7,840,313 B2 | 11/2010 | Horio | | |
| 7,873,442 B2 | 1/2011 | Tsui | | |
| 7,898,112 B2 | 3/2011 | Powell | | |
| 7,930,070 B2 | 4/2011 | Imes | | |
| 7,983,799 B2 | 7/2011 | Bose | | |
| 8,027,752 B2 * | 9/2011 | Castaldo et al. | .............. | 700/296 |
| 8,280,799 B2 * | 10/2012 | Bing | .............. | 705/37 |
| 8,527,398 B2 * | 9/2013 | Bing | .............. | 705/37 |
| 2002/0036430 A1 * | 3/2002 | Welches et al. | ................. | 307/18 |
| 2002/0060556 A1 | 5/2002 | Wall | | |
| 2003/0080741 A1 | 5/2003 | LeRow | | |
| 2004/0051387 A1 | 3/2004 | Lasseter | | |
| 2004/0252525 A1 | 12/2004 | Aldridge | | |
| 2005/0015283 A1 | 1/2005 | Iino | | |
| 2006/0206240 A1 | 9/2006 | Tsui | | |
| 2007/0040382 A1 | 2/2007 | Towada | | |
| 2008/0179966 A1 | 7/2008 | Horio | | |
| 2008/0238215 A1 | 10/2008 | Ye | | |
| 2008/0262820 A1 | 10/2008 | Nasle | | |
| 2008/0278000 A1 | 11/2008 | Capp | | |
| 2009/0062969 A1 | 3/2009 | Chandra | | |
| 2009/0063122 A1 | 3/2009 | Nasle | | |
| 2009/0146505 A1 | 6/2009 | Powell | | |
| 2010/0076613 A1 | 3/2010 | Imes | | |

(Continued)

*Primary Examiner* — Kidest Bahta
(74) *Attorney, Agent, or Firm* — Triangle Patent, PLLC

(57) ABSTRACT

Systems and methods for coordinating selective activation of a multiplicity of emergency power generation equipment over a predetermined geographic area for distribution and/or storage to supply a microgrid of electrical power, and automatic, selective disconnect any of the at least one power generator from providing power supply to the microgrid or wider area grid.

11 Claims, 4 Drawing Sheets

(56) References Cited

U.S. PATENT DOCUMENTS

| | | |
|---|---|---|
| 2010/0179704 A1 | 7/2010 | Ozog |
| 2010/0198421 A1 | 8/2010 | Fahimi |
| 2010/0222934 A1 | 9/2010 | Iino |
| 2011/0035073 A1 | 2/2011 | Ozog |
| 2011/0071882 A1 | 3/2011 | Jackagnanam |
| 2011/0082596 A1 | 4/2011 | Meagher |
| 2011/0082597 A1 | 4/2011 | Meagher |
| 2011/0093127 A1 | 4/2011 | Kaplan |
| 2011/0118885 A1 | 5/2011 | Oi |
| 2011/0172835 A1 | 7/2011 | Imes |
| 2013/0079939 A1* | 3/2013 | Darden et al. .............. 700/291 |
| 2013/0099565 A1* | 4/2013 | Sachs et al. ................ 307/25 |

* cited by examiner

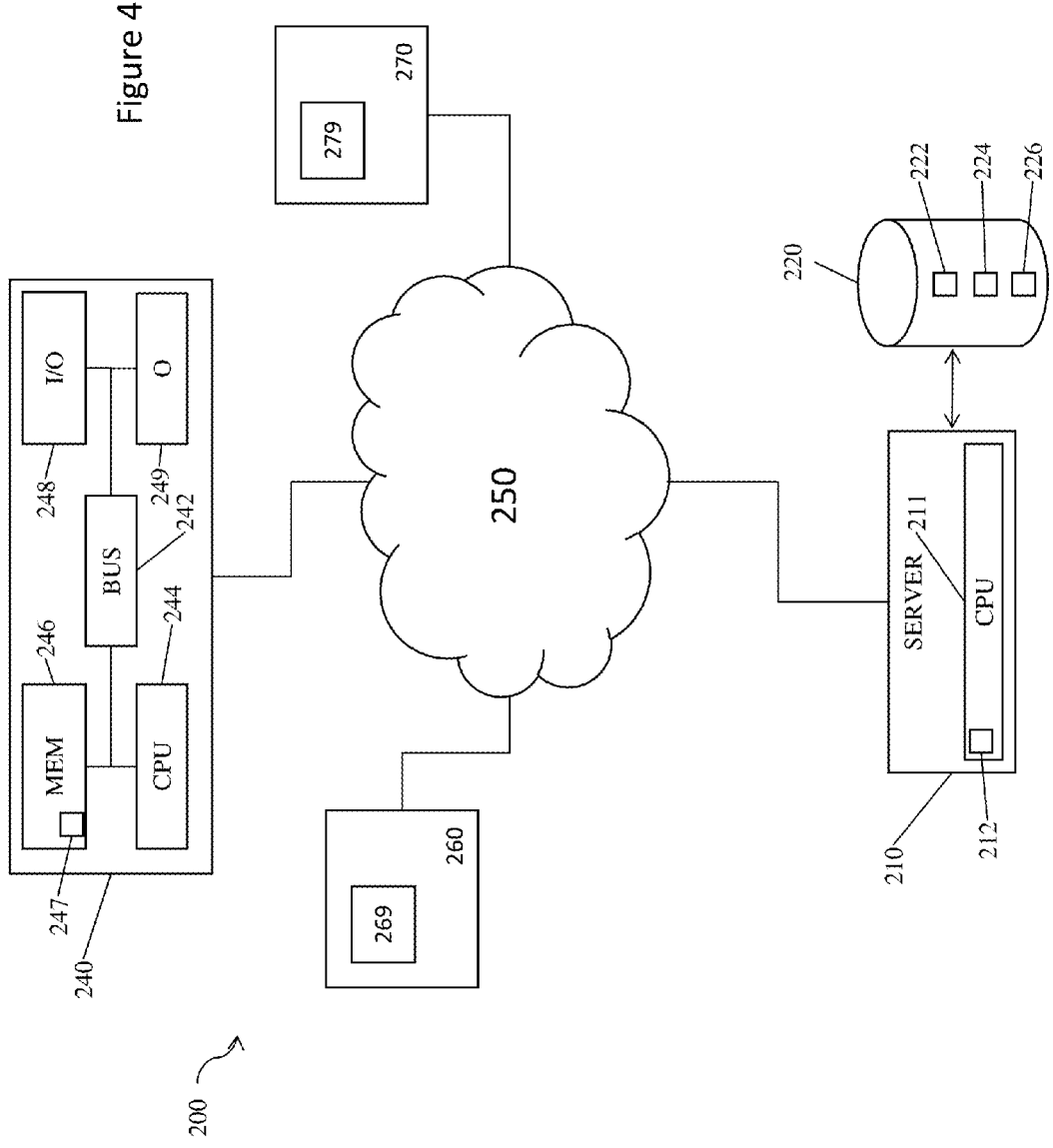

SYSTEMS AND METHODS FOR MICROGRID POWER GENERATION MANAGEMENT WITH SELECTIVE DISCONNECT

BACKGROUND OF THE INVENTION

1. Field of the Invention

The present invention relates to methods and systems for selectively disconnecting a power generation source, such as a microgrid, from the main utility grid, and more particularly, selectively disconnecting a power generation source in response to power disruptions or instability.

2. Description of the Prior Art

It is known in the prior art to provide management of power generation or supply including its connection to a power grid for energy distribution, including systems and methods for management of power generation for microgrids, and more particularly to systems related to disconnection of a power generation source from the main power grid, especially in the case of power disruption or instability, methods for detecting power disturbances and disconnecting a power generation source from the power grid, and methods for disconnection of a microgrid or power generator source from the main power grid in response to detection of power disruptions or instability. Many of these prior art documents are specifically related to islanding detection and anti-islanding protection.

By way of example the following are relevant prior art documents for power generation distribution supply management including disconnection of power generation from a grid supply system, consider the following:

US Pub. No. 20040252525 for Method and apparatus for disconnecting an electrical generator from the electricity supply, by inventors Aldridge, et al., describing a controller for disconnecting an electrical generator from the single phase domestic energy supply, wherein the controller includes: means for determining whether the frequency of the single phase domestic electricity supply falls outside a predetermined range; means for determining whether the rate of change of frequency of the single phase domestic electricity supply falls outside a predetermined range; means for determining whether the voltage of the single phase domestic energy supply falls outside a predetermined range; and means for disconnecting an electrical generator from the single phase domestic electricity supply if any of the measured parameters are outside of a predetermined range.

U.S. Pat. No. 7,834,479 and US Pub. No. 20080278000 for Methods and systems for intentionally isolating distributed power generation sources, assigned to Beacon Power Corporation, which describe a method for operating a mini-grid including one or more power generation sources and one or more loads connected to a bus, including the steps of: monitoring a condition of a utility grid; disconnecting the mini-grid from the utility grid to operate the mini-grid independently in response to a power disruption over the utility grid; monitoring at least one of a frequency and voltage of power on the bus; and providing an interconnect device connected to the bus, the interconnect device including at least one of an energy storage device and a power quality compensator.

U.S. Pat. No. 7,840,313 and US Patent Application Pub. No. 20080179966 for Grid interconnection device, grid interconnection system, and electric power control system, assigned to Sanyo Electric, describe a grid interconnection device that converts electric power from a power supply device into predetermined alternating-current power and interconnects the power supply device to a power distribution system, the grid interconnection device including: a detector configured to detect islanding of the power supply device; a receiver configured to receive power failure information including local area information indicative of an area in which a power failure occurs; and a determination unit configured to determine whether or not local area information contained in the power failure information is different from local area information indicative of the interconnected power distribution system, wherein the system is configured to perform power system separation from the power distribution system so as to prevent islanding when the detector detects the islanding state.

U.S. Pat. No. 7,898,112 and US Patent Application Pub. Nos. 20090146505 for Apparatuses and methods to connect power sources to an electric power system, assigned to Tigo Energy, Inc., disclose and teach an apparatus having a first connector to interface with a distributed energy source; a second connector to interface with an electric power system; at least one switch coupled between the first connector and the second connector; at least one sensor coupled with the switch; and a controller coupled with the at least one switch, the controller to use the at least one switch to selectively connect or disconnect an electric path between a first connector and second connector based on signals from the sensor; wherein after opening the switch in response to an output of the distributed energy source being outside a predetermined range, the controller is to hold off a period of time according to a set of rules and constraints prior to resetting.

U.S. Pat. No. 6,219,623 for Anti-islanding method and apparatus for distributed power generation, assigned to Plug Power, Inc., describing an anti-islanding apparatus for isolating a power source from a failed electrical grid, including a power converter to connect the power source and the grid; a means for measuring a voltage of the grid; a means for calculating a voltage trend in the grid voltage, using a present grid voltage measurement and a prior grid voltage measurement; a means for calculating a positive feedback power converter control signal based on the voltage trend; a control circuit connected to the power converter, wherein the control circuit applies the control signal to the power converter; and a means of disconnecting the power source from the grid when the present grid voltage is outside pre-defined limits.

U.S. Pat. No. 7,427,815 and US Pub. No. 20080238215 for Method, memory media and apparatus for detection of grid disconnect, assigned to General Electric, teach a method for preventing islanding in a power system that includes a power grid having a feeder connected in circuit with a distributed generator and at least one load, including the steps of: determining the phase shift of a voltage based solely on sequential frequency measurements at an output of the distributed generator; comparing the phase shift to a threshold phase shift that signifies a phase shift due to a disconnect of the grid from the feeder; and if the phase shift is greater than the threshold phase shift, issuing a command for a disconnect of the distributed generator from the feeder.

U.S. Pat. No. 7,138,728 and US Pub. No. 20030080741 for Anti-islanding techniques for distributed power generation, assigned to Youtility, Inc., describe an anti-islanding system for distributed power on a grid, having a distributed power source operatively coupled to a grid and adapted with output current control, the distributed power source for providing power; a voltage sensor connected to a node between the distributed power source and the grid, and adapted to monitor grid voltage; a contactor operatively coupled between the distributed power source and the voltage sensor, and adapted for disconnecting the grid from the distributed power source; and an anti-islanding protection controller operatively coupled to the distributed power source to selectively output a current pulse in the power being provides so as to cause a voltage deflection in the grid voltage if an island condition exists, and to detect and island condition based on voltage deflection data provided by the voltage sensor wherein the current pulse is requested by the anti-islanding protection controller according to a pre-defined routine depending on the voltage deflection data provided by the voltage sensor.

U.S. Pat. No. 6,815,932 and US Pub. No. 20020060556 for Detection of islanded behavior and anti-islanding protection of a generator in a grid-connected mode, assigned to Capstone Turbine Corporation, teach a method of controlling a generator system connected to an electric power system including the steps of: measuring an output frequency characteristic of the generator system; estimating a first phase angle and frequency of the measured frequency characteristic using a first phase locked loop having a first bandwidth; estimating a second phase angle and frequency of the measured frequency characteristic using a second phase locked loop having a second bandwidth greater than the first bandwidth; calculating a frequency difference between the first and second estimated frequencies; calculating an angle variation that is proportional to the calculated frequency difference; adding the estimated second phase angle and the calculated angle variation so as to form an output current phase angle reference; and controlling an output current phase angle of the generator system to be aligned with the output current phase angle reference; additional steps include determining whether or not the generator system is within a generation island based on the measured frequency characteristic, and stopping the generator system from delivering electric power to the electric power system if the generator system is determined to be within a generation island.

By way of example the following are relevant prior art documents relating to power management: U.S. Pat. No. 7,115,010 & US Pub. No. 20040051387 for Control of small distributed energy resources, assigned to Wisconsin Alumni Research Foundation, describe and teach a microsource system for providing power in an isolation mode or in a grid mode that is configured to couple to a power system without modification of the existing equipment in the power system, wherein the microsource system is configured for use in a microgrid, and wherein the microsource power source may be a fuel cell, a microturbine, battery, or photovoltaic cell.

U.S. Pat. No. 7,983,799 & US Pub. No. 20110118885 for System and method for controlling microgrid, assigned on the document faces to General Electric, disclose and teach a system for controlling a microgrid including microgrid assets, with at least one of the microgrid assets comprising a different type of electrical generator than an electrical generator of another of the microgrid assets; a tieline for coupling the microgrid to a bulk grid; and a tieline controller for providing tieline control signals to adjust active and reactive power in microgrid assets, and further describes that the electrical generators comprise at least one renewable energy source.

U.S. Pat. No. 7,834,479 & US Pub. No. 20080278000 for Methods and systems for intentionally isolating distributed power generation sources, assigned on the document faces to Beacon Power Corporation, disclose and teach a method for operating a mini-grid including one or more power generation sources and one or more loads connected to a bus. The method includes the steps of: monitoring a condition of the utility grid; disconnecting the mini-grid from the utility grid to operate the mini-grid independently in response to a power disruption over the utility grid; monitoring at least one of a frequency and a voltage of power on the bus; and providing an interconnect device connected to the bus, the interconnect device including at least one of: an energy storage device for absorbing or releasing real power to control the frequency of the power on the bus, and power quality compensator for absorbing or releasing reactive power to control the voltage of the power on the bus.

US Pub. No. 20070040382 for Self-supporting power generation station, by inventor Towada, teaches a scalable microgrid for providing power to areas remote from the existing power grid, wherein the microgrid comprises at least two power pods linked in parallel, and each power pod has at least one micro-turbine fueled by methane gas, and wherein additional power pods may be added as power needs increase.

By way of example, relevant documents relating to power management and optimization include: US Pub. No. 20090062969—Hybrid robust predictive optimization method of power system dispatch, assigned on the document to General Electric, and describes a system for controlling and optimizing operation of a microgrid by integrating power generation, load and storage assets; it also describes a predictive algorithm that is used to dynamically schedule different assets, the predictive algorithm optimizes the microgrid operation over a predetermined time horizon based on predicted future microgrid asset conditions.

US Pub. Nos. 20100179704 & 20110035073—Optimization of microgrid energy use and distribution, assigned on the document face to Integral Analytics, Inc., describes a system for optimization of energy use and distribution within a microgrid system, including forecasting of individualized demand by end-use or individualized demand by location for at least one customer or customer location, wherein forecasting of individualized demand may include inputs including: load prediction, weather forecast, risk given load uncertainty; customer compliance forecasts, customer probability of override forecasts; time of day effects; and day of week effects.

US Pub. No. 20100222934 for System for managing energy at loads, by inventors Iino, et al., teaches an energy management system comprising a demand prediction unit configured to predict demand at a load to which energy is supplied and a load adjustment range prediction unit to predict a load adjustment range by using historical data, wherein the system is applied to a microgrid capable of performing demand-side management.

US Pub. Nos. 20110082596 for Real time microgrid power analytics portal for mission critical power systems; and US Pub. No. 20110082597 for Microgrid model based automated real time simulation for market based electric power system optimization, assigned on the document face to EDSA Micro Corporation, describes a system for real-time modeling of electrical system performance of a microgrid electrical system, wherein predicted data for the electrical system is generating using a virtual system model, and the virtual system model is updated based on real-time data to forecast the cost of operating the microgrid and the reliability and availability of the microgrid system.

Furthermore, in relevant art, it is known to describe how energy pricing is integrated into the described forecasting models. By way of example of relevant prior art documents, consider the following: US Pub. Nos. 20110082596 for Real time microgrid power analytics portal for mission critical power systems; US Pub. No. 20110082597 for Microgrid model based automated real time simulation for market based electric power system optimization, assigned on the document faces to EDSA Micro Corporation, teach a system for real-time modeling of electrical system performance of a microgrid electrical system, wherein predicted data for the electrical system is generating using a virtual system model that is updated based on real-time data to forecast the cost of operating the microgrid and the reliability and availability of the microgrid system. Furthermore, all transactions between the public electric service on the macrogrid and the microgrid infrastructure are closely monitored, and rate and pricing information for the management of electricity exchange are also maintained. Closely monitoring this information and updating the virtual and real time models accordingly allows the systems and methods disclosed herein to optimize energy consumption to meet various objectives of the microgrid operator, wherein predicted data can be used to generate market-based pricing predictions based on the performance of the components of the electrical system.

US Pub. No. 20080262820 for Real-time predictive systems for intelligent energy monitoring and management of electrical power networks; and US Pub. No. 20090063122 for Real-time stability indexing for intelligent energy monitoring and management of electrical power network system, assigned to EDSA Micro Corporation, teach the following: the '820 publication describes a system for intelligent monitoring and management of an electrical system including a data acquisition component to acquire real-time data from the electrical system; a power analytics server comprising a real-time energy pricing engine connected to a utility power pricing data table and configured to generate real-time utility power pricing data, a virtual system modeling engine to generate predicted data output for the electrical system, an analytics engine configured to monitor the real-time data output and the predicted data output of the electrical system, a machine learning engine configured to store and process patterns observed from the real-time data output and the predicted data output and configured to forecast an aspect of the electrical system. The '122 publication is a continuation-in-part of '820 and also describes a system for intelligent monitoring and management of an electrical system.

US Pub. No. 20100198421 for Methods and apparatus for design and control of multi-port power electronic interface for renewable energy sources, assigned on the document face to Board of Regents, The University of Texas System, teaches a method for managing energy movement wherein a determination of whether operational characteristics should be modified is based on at least one factor of: a renewable energy generation forecast, an energy consumption forecast, and a substantially real-time price of energy, with the application of this method and apparatus in a microgrid setting.

U.S. Pat. No. 7,873,442 & US Pub. No. 20060206240 for System and method for managing and optimizing power use, assigned on the respective document faces to The Energy Authority, Inc., describe an optimization method for the use of utility power including the steps of: initializing a utility power load requirement forecast, an amount of available utility power, and aggressiveness position for optimizing the use of available power, a utility power schedule; determining an initial power use position for a peak load utility power use range and a low load range; adjusting the utility power use for real-time transactions, adjusting for utility power storage flexibility, and producing a utility power use schedule optimized for use of said utility power in low load range and peak load range, wherein the real-time schedule optimization provides information on how to adjust the use of resources when updated load forecasts based on actual load, and market prices change during the day.

U.S. Pat. No. 7,930,070 & US Pub. No. 20100076613 for System, method, and module capable of curtailing energy production within congestive grid operating environments; and US Pub. No. 20110172835 for System and method of curtailing energy production within congestive grid operating environments, assigned on the document face to Kingston Consulting, Inc., describes a method of managing power generation that provides a framework to allow proactive management of alternative energy production through asset monitoring and characterization relative to real-time and anticipated grid conditions, and further describes that the energy management system can perform congestion forecasting, energy output forecasting, proactive curtailments, storage control, dispatch control, real-time pricing, dynamic pricing, or various combinations of features, and a remote monitor and control module that can include on-grid and off-grid control logic, real-time performance monitoring, meteorological data interface, microgrid or asynchronous transmission capabilities, local performance characterization logic, a control panel, or various combinations of features.

US Pub. No. 20110093127—Distributed energy resources manager by inventor Kaplan, describes a distributed energy resources manager that connects electrical assets in an electricity distribution grid with other information processing systems to optimize a flow of electric power within the electricity distribution grid.

Further describes that distributed resources may be utilized to meet system-wide needs such as reducing peak consumption, storing excess utility-scale wind or solar power, responding to price signals including real-time or critical peak pricing, or supply ancillary grid services.

US Pub. No. 20110071882 for Method and system for intermediate to long-term forecasting of electric prices and energy demand for integrated supply-side energy planning, assigned on the document face to International Business Machines Corporation, describes a method of price forecasting in an electrical energy supply network and/or load (energy demand) forecasting of a given consumer of electrical energy, for identifying the optimal mix of energy hedge and exposure to day ahead/spot market prices for deriving economic benefits in overall energy expenditure; and further describes modeling using real time price and day ahead price data and probability distributions.

U.S. Pat. No. 7,657,480 for Decision support system and method, which was assigned on the document face to Air Liquide Large Industries, describes a computer-implemented method for identifying an excess energy capacity in a production supply chain by a supply chain operator, in which the supply chain operator also operates at least one power generation facility to sustain industrial production by the production supply chain, the supply chain operator is capable of consuming and selling electricity produced by the power generation facility; and further describes that the forecasted price for electricity during a time period is determined by a forecasting and planning model utilizing historical and real-time data, including the real-time commodity prices for electricity.

U.S. Pat. No. 6,583,521 for Energy management system which includes on-site energy supply to inventors Lagod, et al., describes a system for managing the supply of power to a load that receives power from an electric grid, including: at least one on-site power generator that is capable of supplying power to the load independently of the power grid; a controller which processes data relating to at least one factor that is predictive of the reliability and/or quality of power supplied to the load, and selects the power grid or the on-site generator as a preferred power source; and a switch which is responsive to the selection of the preferred power source to connect the load to the selected power source, and further describes that the selection of the preferred power source may be on the basis of relative costs of power supplied via the power grid and the on-site generator; and the relative costs may include data regarding operating costs of the on-site generator, the price of fuel consumed by the on-site generator, and time-of-day pricing (including real time pricing) of power supplied via the power grid.

US Pub. No. 20050015283 for Electric-power-generating-facility operation management support system, electric-power-generating-facility operation management support method, and program for executing support method, and program for executing operation management support method on computer, assigned on the document face to Kabushiki Kaisha Toshiba, describes an electric-power-generating-facility operation management support system for determining economically-optimal operational conditions based upon real-time information with regard to the demand for the electric power and the price thereof as well as information with regard to properties of the electric power generating facilities.

SUMMARY OF THE INVENTION

The present invention relates to predictive-modeling-based optimization of power generation and management systems and methods for microgrid distributed power generation applications, including selective, coordinated engagement of emergency power generation equipment, such as, by way of example and not limitation, generators.

It is an object of this invention to provide systems and methods for microgrid distributed power generation and management using emergency power generation equipment optimized using predictive modeling methods for selective engagement and disengagement or disconnection from the microgrid or grid, to provide and control a power supply for distribution and/or storage based upon the grid power demands, energy pricing changes, predetermined levels of market rates, and combinations thereof, and for selective disconnect based upon a predetermined condition or trigger event.

Accordingly, a broad embodiment of this invention is directed to power generation systems and methods that selectively engage and disengage or disconnect emergency power generation equipment to produce electricity for distribution over a microgrid and/or for storage until later distribution. Furthermore, the present invention includes embodiments in systems and methods using predictive modeling for optimization and coordinated selective activation of emergency power generation equipment over a predetermined geographic area for distribution and/or storage to supply a microgrid of electrical power based upon at least one market-based factor, including but not limited to energy rates in the market, pricing changes, power demand within the microgrid, and combinations thereof, and selective disconnection of any of the at least one activated emergency power generation equipment from the microgrid or grid.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 4 is a schematic diagram of a networked system and remote server computer associated with the systems and methods of the present invention illustrated in the other figures.

DETAILED DESCRIPTION

Figure 1:
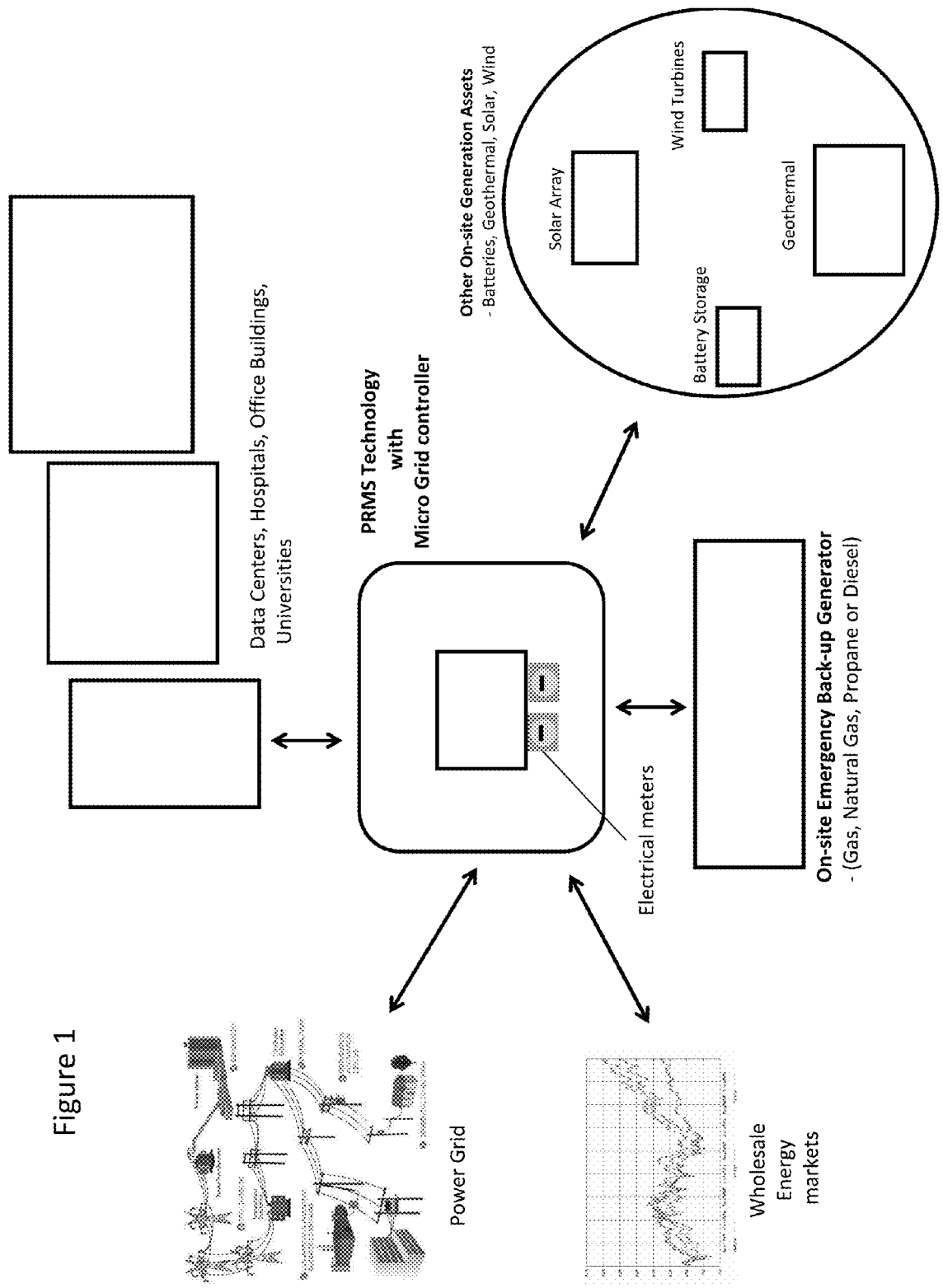
FIG. 1 is a schematic diagram illustrating one embodiment of the present invention.

Referring now to the drawings in general, the illustrations are for the purpose of describing a preferred embodiment of the invention and are not intended to limit the invention thereto.

The present invention provides methods for power generation and management including the steps of: providing power generation systems including at least one piece of equipment for generating electrical power located at predetermined, distributed locations for providing emergency back-up power supply for use in situs (on site or on location of the source of power generation), i.e., without distribution of the electrical power beyond the locality where it is generated; and using predictive modeling methods to optimize timing for selective engagement of the power generation equipment; and selectively activating the power generation equipment to produce electricity for distribution over a microgrid and/or for selective disconnect form the grid, such as source in response to power disruptions or instability, and optionally including power storage until later distribution over the microgrid.

The present invention also provides a system for power generation and management including: a multiplicity of power generation equipment located at predetermined, distributed locations for providing emergency back-up power supply for use in situs, without distribution of the electrical power beyond the locality where it is generated; wherein the equipment is selectively activatable, and constructed and configured in connection with an electrical power microgrid to produce electricity for distribution over the microgrid and/or for storage until later distribution over the microgrid, including automatic selective disconnection of any of at least one power generation equipment to preclude power supply to the grid or microgrid from that equipment due to a trigger event, such as out-of-phase power supply or other reason; and further including optimization of power supply to the microgrid using predictive modeling methods for selective engagement, including a Price Resource Management System (PRMS), including:

a monitoring device that tracks real time wholesale energy market price;

a database for storing wholesale energy market price;

an analyzing device for storing and analyzing wholesale market price data, and on a per power storage device basis, data indicative of the electricity remaining in that specific device;

at least one server computer, located centrally or distributed over a network, the at least one server computer in network communication for monitoring and being responsive to the market price fluctuation analysis, and operable for generating event instructions to a controllable device for releasing electrical power to the power grid for distribution when the market price is at least at a predetermined threshold(s)t you at which point the power generated is directed to be released and sold to the power grid (note that the power may be generated directly for immediate distribution or for temporary storage before distribution);

a device interface for facilitating and producing communication of power releasing instructions to at lease one controllable device on power storage device; and at lease one controllable device associated with and preferably connected to the at least one power generator and/or electricity storage device, wherein each controllable device is operable for selectively enabling and disabling the flow of electric power from the electric storage to an electric grid, preferably a microgrid, for distribution thereon.

Preferably, embodiments of the present invention include systems and methods for coordinating selective activation of a multiplicity of emergency power generation equipment over a predetermined geographic area for distribution and/or storage to supply a microgrid of electrical power for a substantially similar geographic area. Methods include steps of providing a microgrid distributed power generation system including at least one power generation equipment for generating electrical power located at predetermined, distributed locations for providing emergency back-up power supply for use at the locations of power generation, wherein the microgrid is associated with a grid for distributing power over a larger geographic area than the microgrid; providing a controller system connected to the at least one power generation equipment for automatically selectively disconnecting any of the at least one power generation equipment from the microgrid, the controller system further including: a monitoring device in communication connection that monitors the at least one power generation equipment; at least one server computer, located centrally or distributed over a network, the at least one server computer in network communication with the monitoring device and a controller connected to a power distribution switch associated with and connected to the at least one power generation equipment, and operable for generating event instructions to a controllable device for releasing and/or preventing release of electrical power to the power grid for distribution when a predetermined conditions exist; wherein each controllable device is operable for selectively enabling and disabling the flow of electric power from the electric storage to an electric microgrid, for distribution; a device interface for facilitating and producing communication of power releasing and/or preventing power release instructions to at least one controllable device; and the at least one server computer automatically selectively activating the power generation equipment to produce electricity for distribution over the microgrid and/or for selective disconnection or disengagement of power generation equipment that is activated, providing for storage until later distribution via the microgrid based upon instructions from the controller.

In addition to the foregoing steps, methods according to the present invention, further include the steps of: the at least one server computer automatically coordinating selective activation of a multiplicity of emergency power generation equipment during any period wherein power failure on the grid is detected; and/or the system providing for automatic power storage of power generated by the equipment.

Also, the method provides for the selective activation of the power generation equipment to occur at detection of power failure in the grid, and the system server computer automatically requesting curtailment from a utility company controlling supply and billing for power received through the grid. Preferably, the system further includes an automated remote controller for activating the at least one piece of equipment based upon instruction received by the controller from the remote server computer for automatically generating power for use locally during a period of power failure in the grid, and for automatically registering with the power company or utility service that controls and bills for power consumed from the grid and automatically requesting curtailment when selective activation of the microgrid power generation equipment is triggered by power failure or outage in the grid.

By way of example but not limitation, the systems and methods of the present invention are applied to emergency back-up power generation equipment, specifically gasoline or diesel powered generators, located at cellular tower sites. While typically the generators must be activated at least once per week or so, i.e., for maintenance activation, in order to ensure functionality when the emergency power provided by the generator is needed, due to electrical grid power failure or loss, their activation is arbitrary, and the power generated during the maintenance activation is not harnessed or used in any way.

FIG. 1 illustrates a schematic diagram of a system illustrating an embodiment of the present invention. Components of the system provide for operation of a microgrid system constructed and configured for automatically managing electricity generation and releasing by a cell tower emergency power backup generator, including at least one power generator, and for automatically selectively disconnecting or disengaging the at least one power generator or power generation equipment from direct supply to the microgrid or wider area grid. Preferably, the at least one power generator includes at least one electricity generator, typically used for emergency backup power supply for a microgrid locality, such as a university, hospital, business, cell tower, etc. More preferably, the present invention provides for at least one power generator that is associated with a cell tower for the use of emergency backup during electricity failure or blackout conditions, and that any of the at least one power generator may be selectively disconnected or disengaged from providing power supply to the microgrid or wider area grid.

Furthermore, the at least one power generator may include more than one type of power generator. In one embodiment of the present invention the at least one power generator is selected from the group consisting of solar arrays, natural gas generators, propane generators, diesel generators, and combinations thereof. In another embodiment, the at least one power generator includes at least two different types of power generating equipment, selected from the group consisting of solar arrays, natural gas generators, propane generators, diesel generators, and combinations thereof. The present invention is constructed and configured to generate electricity for immediate supply through direct connection into a microgrid electrical distribution system, including selective disconnect of any of a multiplicity of power generation equipment from the microgrid and/or the larger or wider area grid power supply. Additionally, in preferred embodiments, the system of the present invention further includes at least one energy storage mechanism or device for providing temporary power storage, such as in the case of selective disconnect of any power generation equipment from microgrid or grid connection and active supply, for any reason, such as a trigger event, or for predetermined reasons that are preferably programmed into a remote server computer as instructions for automated control of the equipment.

For optimization of management of power generation and distribution via the systems and methods of the present invention, in addition to the foregoing, the system further includes the components of a Price Resource Management System (PRMS), including:

a monitoring device that tracks real time wholesale energy market price;

a database for storing wholesale energy market price;

an analyzing device for storing and analyzing wholesale market price data, and on a per power storage device basis, data indicative of the electricity remaining in that specific device;

at least one server computer, located centrally or distributed over a network, the at least one server computer in network communication for monitoring and being responsive to the market price fluctuation analysis, and operable for generating event instructions to a controllable device for releasing electrical power to the power grid for distribution when the market price is at least at a predetermined and/or programmable threshold(s) at which point the power generated is directed to be released and sold to the power grid (note that the power may be generated directly for immediate distribution or for temporary storage before distribution);

a device interface for facilitating and producing communication of power releasing instructions to at lease one controllable device on power storage device;

at lease one controllable device associated with and preferably connected to the at least one power generator and/or electricity storage device, wherein each controllable device is operable for selectively enabling and disabling the flow of electric power from the electric storage to an electric grid, preferably a microgrid, for distribution thereby (public), including but not limited to selective disconnect of any of the at least one power generation equipment from the microgrid supply.

Figure 2:
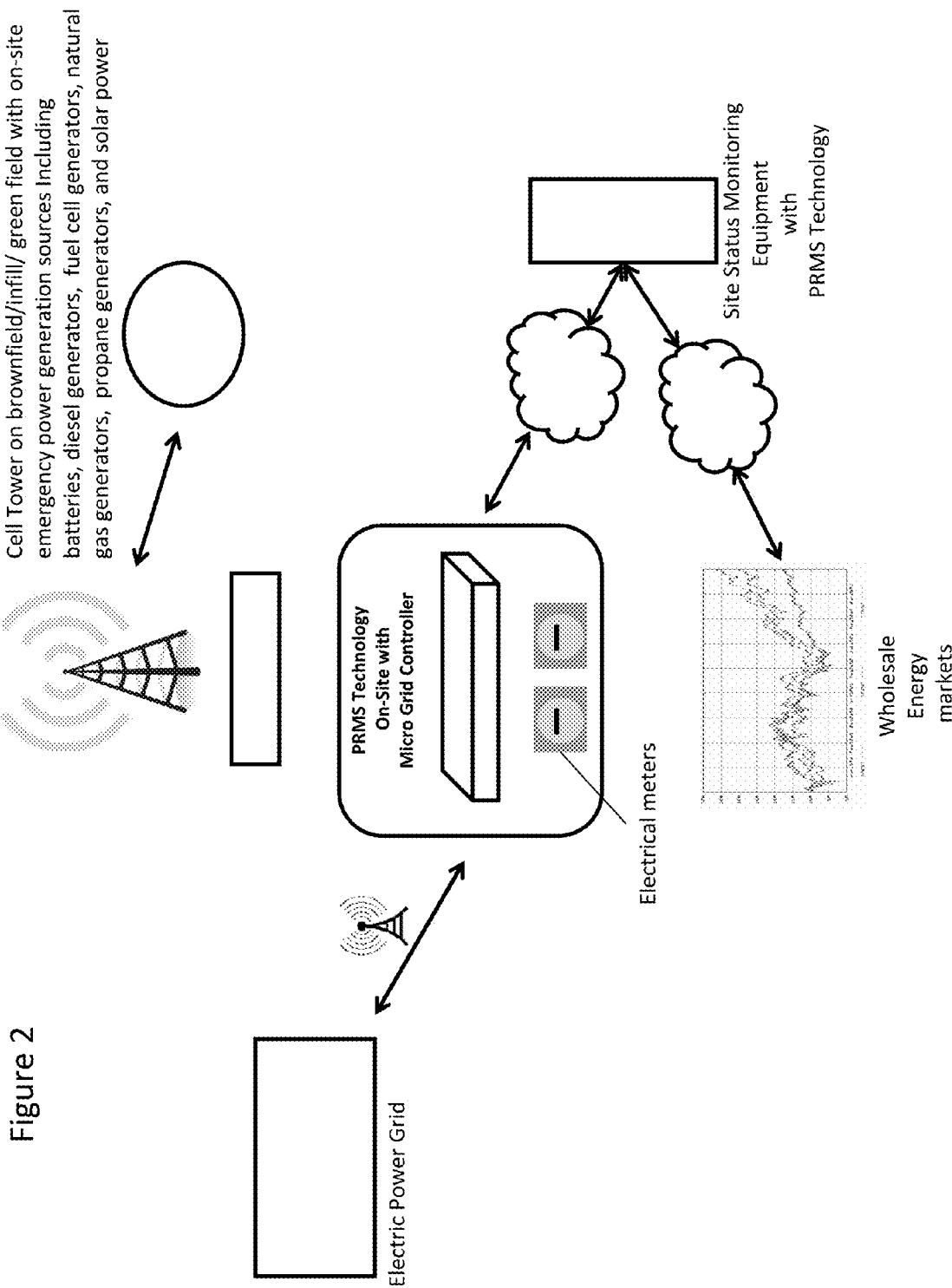
FIG. 2 is another schematic diagram illustrating one embodiment of the invention.
Figure 3:
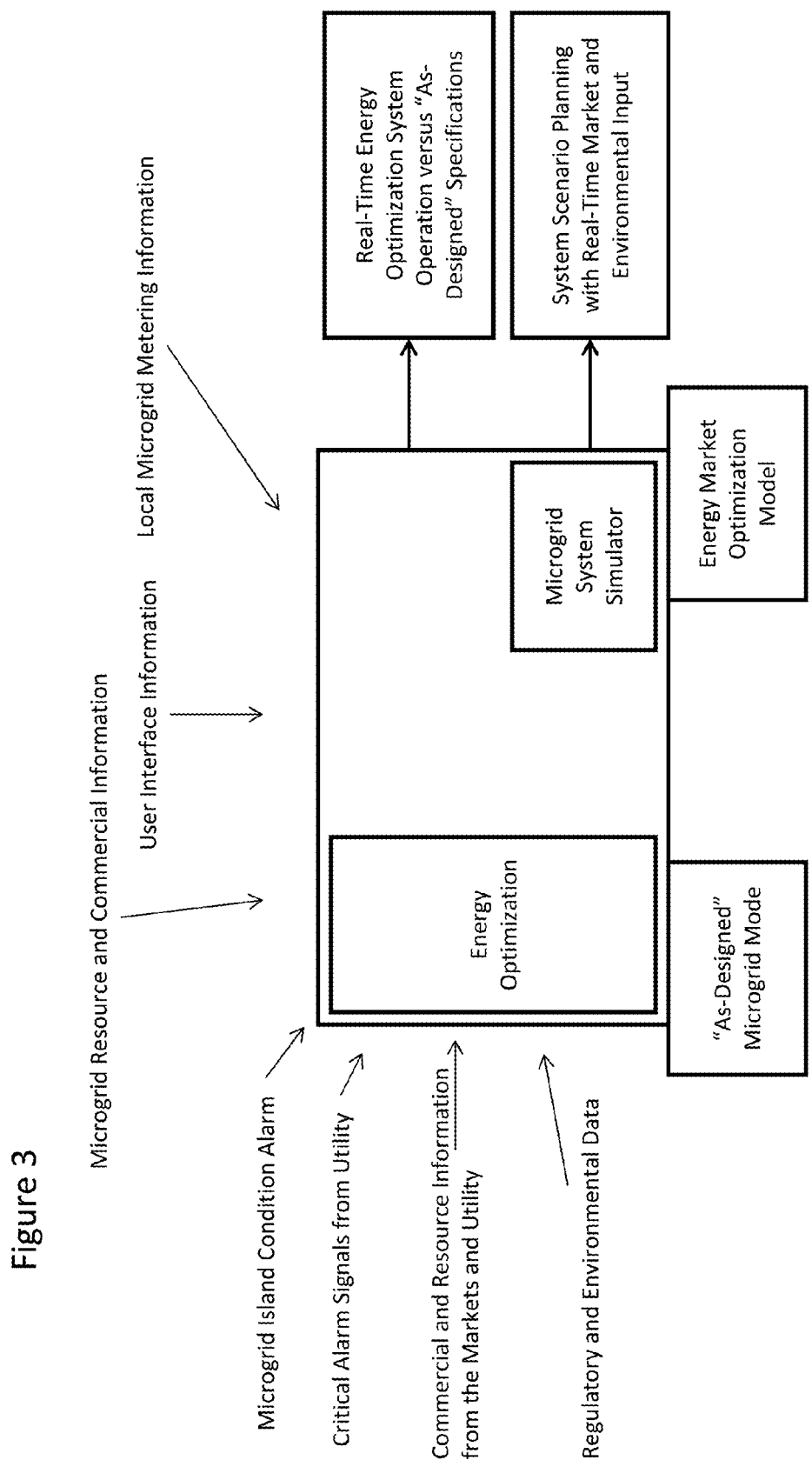
FIG. 3 is a diagram of the central controller illustrated in FIG. 2.

FIG. 2 shows another schematic diagram illustrating one embodiment of the invention. Steps of managing power generation and distribution for a microgrid are shown, including providing a power generation system including at least one piece of equipment for generating electrical power located at predetermined, distributed locations for providing emergency back-up power supply for use at the locations of power generation, without distribution of the electrical power beyond the locality where it is generated; and selectively activating the power generation equipment to produce electricity for distribution over a microgrid and/or for storage until later distribution over the microgrid. FIG. 3 illustrates a diagram of the central controller illustrated in FIG. 2.

FIG. 4 is a schematic diagram of a networked system and remote server computer associated with the systems and methods of the present invention. As illustrated in FIG. 4, a basic schematic of some of the key components of the system including remote server computer and network access to the microgrid distributed power generation equipment, according to the present invention are shown. The system 100 comprises a server 110 with a processing unit 111. The server 110 is constructed, configured and coupled to enable communication over a network 150. The server provides for user interconnection with the server over the network using a personal computer (PC) 140 positioned remotely from the server. Furthermore, the system is operable for a multiplicity of remote personal computers or terminals 160, 170. For example, in a client/server architecture, as shown. Alternatively, a user may interconnect through the network 150 using a user device such as a personal digital assistant (PDA), mobile communication device, such as by way of example and not limitation, a mobile phone, a cell phone, smart phone, laptop computer, netbook, a terminal, or any other computing device suitable for network connection. Also, alternative architectures may be used instead of the client/server architecture. For example, a PC network, or other suitable architecture may be used. The network 150 may be the Internet, an intranet, or any other network suitable for searching, obtaining, and/or using information and/or communications. The system of the present invention further includes an operating system 112 installed and running on the server 110, enabling server 110 to communicate through network 150 with the remote, distributed devices, including controller, monitoring device, power generation equipment, and combinations thereof. The operating system may be any operating system known in the art that is suitable for network communication.

From a microgrid supply described hereinabove, the power may be further distributed over a wider power grid and also withheld from distribution over the wider or larger power grid during periods of local power requirements (e.g., when the grid experiences power loss or failure). For the purposes of this application, the ability to provide power generation creates a microgrid on site with the power generation equipment; surplus generation may be further distributed beyond the immediate location of the power generation, i.e., beyond the microgrid created thereby, to a broader electrical power grid, a primary grid, and the like, wherein the electricity supplied thereto is provided by a variety of sources (e.g., an energy company).

Certain modifications and improvements will occur to those skilled in the art upon a reading of the foregoing description. By way of example and not limitation, systems and methods of the present invention for providing microgrid power from power generators may supply the power directly into a microgrid or may temporarily store the power generated in energy storage mechanisms or apparatus, such as a power cell or battery, wherein the storage is intended to be released at and for at least one predetermined time into the grid, such as peak grid load times, or high energy demand times, or at times that are calculated based upon energy distribution optimization considerations. And combinations of these factors. Preferably the systems and methods include a remote server computer that is operable in networked communication with the at least one piece of equipment for monitoring the status of the equipment and for activating the equipment remotely based upon triggers identified by the PRMS. Also, the present invention systems and methods provide for curtailment applications wherein if the power goes out to the grid, and the emergency back-up power generation has registered with the power company or management entity, then every time the emergency power is generated, then the system provides for automatic credit for that period of self-supplied or self-generated power even where that power is not distributed over the broader grid.

The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A method for microgrid distributed power generation and management comprising the steps of:
   providing a microgrid distributed power generation system including at least one power generation equipment for generating electrical power located at predetermined, distributed locations for providing emergency back-up power supply for use at the locations of power generation, wherein the microgrid is associated with a grid for distributing power over a larger geographic area than the microgrid;
   providing a controller system connected to the at least one power generation equipment, the controller system further including:
      a monitoring device in communication connection that monitors the at least one power generation equipment;
      at least one server computer, located centrally or distributed over a network, the at least one server computer in network communication with the monitoring device and a controller connected to a power distribution switch associated with and connected to the at least one power generation equipment, and operable for automatically generating event instructions to a controllable device for automatically releasing and/or preventing release of electrical power to the power grid for distribution on the power grid when a predetermined conditions exist; wherein each controllable device is remotely operable by the at least one server computer for selectively automatically enabling and disabling the flow of electric power from the at least one power generation equipment to an electric microgrid, for distribution to the power grid;

a device interface for facilitating and producing communication of power releasing and/or preventing power release instructions to at least one controllable device for selective power generation and disconnect of any of the at least one power generation equipment from the microgrid or grid; and the at least one server computer automatically selectively activating the power generation equipment to produce electricity for distribution over the microgrid via the microgrid based upon instructions from the controller.

2. The method of claim 1, further including the step of the at least one server computer automatically coordinating selective activation of a multiplicity of emergency power generation equipment during any period wherein power failure on the grid is detected.

3. The method of claim 1, further including the step of the system providing for automatic power storage of power generated by the equipment.

4. The method of claim 1, wherein the method provides for the selective activation of the power generation equipment to occur at detection of power failure in the grid, and the system server computer automatically requesting curtailment from a utility company controlling supply and billing for power received through the grid.

5. The method of claim 1, wherein the system further includes an automated remote controller for activating the at least one piece of equipment based upon instruction received by the controller from the remote server computer for automatically generating power for use locally during a period of power failure in the grid.

6. The method of claim 1, wherein the system further includes a remote server computer in networked communication with the at least one piece of equipment for monitoring the status of the equipment and for activating the equipment remotely.

7. A system for microgrid distributed power generation and management comprising:

a multiplicity of power generation equipment located at predetermined, distributed locations for providing emergency back-up power supply for use in situs, without distribution of the electrical power beyond the locality where it is generated upon automatic detection of power failure in a wider grid to which the microgrid is connected, including the power generation equipment; and a monitoring device that tracks real time wholesale energy market price;

a database for storing wholesale energy market price;

an analyzing device for storing and analyzing wholesale market price data, and on a per power storage device basis, data indicative of the electricity remaining in that specific device;

at least one server computer, located centrally or distributed over a network, the at least one server computer in network communication for monitoring and being responsive to the market price fluctuation analysis, and operable for generating event instructions to a controllable device for releasing electrical power to the power grid for distribution when the market price is at least at a predetermined threshold at which point the power generated is automatically directed by the at least one server computer to be released and sold to the power grid;

a device interface for facilitating and producing communication of power releasing instructions to at lease one controllable device on power storage device by the at least one server computer;

at lease one controllable device associated with and preferably connected to the at least one power generator and/or electricity storage device, wherein each controllable device is remotely operable by the at least one server computer for executing the communication of power instructions for selectively enabling and disabling or disconnecting the flow of electric power from the electric storage to an electric microgrid, for distribution thereby; and selectively activating the power generation equipment remotely by the at least one server computer to produce electricity for distribution over the microgrid and/or for storage until later distribution via the microgrid following selective disconnection of the power generation equipment due to a trigger event; wherein the equipment is remotely, selectively, and automatically activatable, and constructed and configured in connection with an electrical power microgrid to produce electricity local use over the microgrid and/or for storage until later distribution over the microgrid.

8. The system of claim 7, further including more than one power generation equipment that is operable for coordinated, selective activation.

9. The system of claim 7, further including a multiplicity of emergency power generation equipment positioned apart over a predetermined geographic area for distribution and/or storage to supply a microgrid of electrical power.

10. The system of claim 7, wherein the at least one equipment is automatically selectively activatable at predetermined times and automatically selectively disconnected from the microgrid or wide area grid.

11. A system for power generation management comprising:

a microgrid distributed power generation system constructed and configured for automatically managing electricity generation and releasing by a cell tower emergency power backup generator based on power failure detection, including at least one power generator, the at least one power generator including at least one electricity generator, wherein the at least one electricity generator is selected from the group consisting of solar arrays, natural gas generators, propane generators, diesel generators, and combinations thereof, wherein the at least one power generator is associated with a cell tower for the use of emergency backup during electricity blackout, constructed and configured to be activated remotely by a power control instruction communicated over a network by a server computer to generate electricity for immediate supply through direct connection into a microgrid electrical distribution system and/or further includes at least one energy storage mechanism for providing temporary power storage for selectively discharging electricity into a microgrid when a wider grid of distributed power experiences a power failure or disruption that is detected by a monitoring device in networked communication to a controller connected to the emergency power generator, and for any of the at least one power generator may be selectively disconnected or disengaged from providing power supply to the microgrid or wider area grid.

\* \* \* \* \*